United States Patent
Bruke

[19]
[11] Patent Number: 5,910,243
[45] Date of Patent: Jun. 8, 1999

[54] DISPLACEMENT DEVICE

[75] Inventor: Richard L. Bruke, Bunkeflostrand, Sweden

[73] Assignee: Spirac Engineering AB, Malmo, Sweden

[21] Appl. No.: 08/950,387

[22] Filed: Oct. 14, 1997

Related U.S. Application Data

[63] Continuation-in-part of application No. 08/545,852, filed as application No. PCT/SE94/00436, May 10, 1994, Pat. No. 5,676,827.

[30] Foreign Application Priority Data

May 10, 1993 [SE] Sweden .................................. 9301637

[51] Int. Cl.⁶ .................................................. B01D 21/24
[52] U.S. Cl. .......................... 210/104; 210/523; 210/524; 198/608; 198/662; 198/676
[58] Field of Search ..................... 210/523, 524, 210/525, 86, 104; 198/608, 662, 676

[56] References Cited

U.S. PATENT DOCUMENTS

| 1,716,228 | 6/1929 | Horne | 210/524 |
|---|---|---|---|
| 2,935,931 | 5/1960 | Ginaven | 100/117 |
| 3,285,415 | 11/1966 | Walker | 210/524 |
| 3,865,727 | 2/1975 | Broling et al. | 210/523 |
| 3,910,775 | 10/1975 | Jackman | 44/13 |
| 3,923,655 | 12/1975 | McKinney | 210/86 |
| 4,364,831 | 12/1982 | Burns et al. | 210/523 |
| 5,000,307 | 3/1991 | Burke | 198/608 |
| 5,078,861 | 1/1992 | Krofta | 210/86 |
| 5,092,453 | 3/1992 | Burke | 198/673 |
| 5,368,153 | 11/1994 | Burke | 198/608 |

FOREIGN PATENT DOCUMENTS

| 174003 | 5/1905 | Germany . |
|---|---|---|
| 46717 | 7/1929 | Norway . |
| 464080 | 3/1991 | Sweden . |
| 468589 | 2/1993 | Sweden . |
| 1057067 | 2/1982 | U.S.S.R. . |
| 1645220 | 4/1991 | U.S.S.R. . |
| 405314 | 2/1934 | United Kingdom . |
| 2024032 | 1/1980 | United Kingdom . |

OTHER PUBLICATIONS

Derwent's abstract, No. 84–187760/30, week 8430, Abstract of SU, 1057067 (Tbilishi Work Safety), Nov. 30, 1983.

Derwent's abstract, No. 92–103328/13, week 9213, Abstract of SU, 164522 (Ternopol Lvov Poly), Apr. 30, 1991.

*Primary Examiner*—Christopher Upton
*Attorney, Agent, or Firm*—Ladas & Parry

[57] ABSTRACT

A device for displacing sediment, for example sand, from the bottom of a liquid-filled container (20) to a receptacle device (29) in which first conveyor (22) is disposed in the edge region (21) of the container (20) near the bottom of the container to receive sediment which accumulates at the bottom. The first conveyor (22) has a rotating screw thread (24) located in a casing (23) and includes a discharge portion (27). A second conveyor (40) consisting of a rotary screw thread (44) in a casing (41) has an infeed opening (43) located at the lower portion of the container, preferably below its bottom, and a discharge portion (42) located above the maximum filling level of the container (20). A mechanical device (50) displaces the sediment from the discharge portion (27) of the first conveyor (22) to the infeed opening (43) of the second conveyor (40) via a tube 50a having a "thread-free" portion nearest the second conveyor. The discharge portion (42) of the second conveyor (40) discharges sediment to a receptacle (29) either directly via a transport device (60).

19 Claims, 7 Drawing Sheets

DISPLACEMENT DEVICE

This application is a continuation-in-part of application Ser. No. 08/545,852 file Nov. 13, 1995, (now U.S. Pat. No. 5,676,827 issues Oct. 14, 1997) which is International Application PCT/SE94/00436 filed on May 10, 1994 and which designated the U.S.

FIELD OF THE INVENTION

The present invention relates to a device for displacing sediment, for example sand, from the bottom of a container filled with liquid to a receptacle device.

BACKGROUND

In many technical applications, liquid is allowed to rest in basins, pools (containers) for varying lengths of time in order that particles located (suspended) in the liquid be allowed to sink to the bottom and there form a sediment. In such contexts, it is often desirable that this sediment be removed from the bottom of the container at the same time as the container is filled with liquid. For example, such needs exist in treatment plants for waste water.

It is previously known to employ for this purpose scraper devices which displace the sediment to an edge region of the bottom of the pool, normally the short side of the pool or container, which is often between 15 and 20 meters long. In order to remove the sediment which has been scraped together in this edge region, use is generally made of an arrangement comprising a pump which depends from a gantry above the pool. The pump includes a pump pipe whose intake opening is located close to the sediment strand. The pump, with its suction pipe is intended to be displaced along the strand of acculmulated sediment.

The pump equipment, with its suspension construction, is expensive and wear on the pump is extreme, since sediment of the type under contemplation here contains considerable quantities of sand. For this reason, use is often made of a simple design in which considerable quantities of air are introduced in the lower region of a "pump pipe", this air then rising upwardly in the water column inside the pump pipe. There thereby occurs a suction effect in the inlet of the pump pipe. The material in the sediment strand accompanies the water which is sucked into the pump pipe and is conveyed by the water to the outlet of the pump pipe above the surface of the water in the pool or container. This type of pump requires considerable electric power. Its lifting height above the surface of the water in the container is low. The ratio of water to sediment is very unfavourable. Normally, the sediment which is pumped up contains approximately 97% water and approximately 3% solid matter, for which reason the degree of efficiency of such an arrangement is poor in the extreme.

As disclosed above, use is also made of other more conventional pumps, but the mixture of sediment and water entails severe wear on the pumps. For all types of pumps, it applies that the mixture which is pumped up is of low total solids content and that, as a result, the mixture must be dewatered in equipment suited for this purpose, normally designated sand dewaterers.

Consequently, the art is in serious need of realizing a technique in which the degree of efficiency is considerably improved, at the same time as the operational reliability of the device itself is high and its service life long.

SUMMARY OF THE INVENTION

The above needs are satisfied by a device having a first open conveyor near the bottom of the container to receive sediment and convey the sediment via a transfer means to a second conveyor, which discharges a mixture of the sediment and water upwardly and out of the container.

The device disclosed according to the present invention provides that, in the mixture which is displaced up to the surface above the water, the sediment generally constitutes more than 60 weight percent. In addition, the displacement requires only low power output in the drive means employed. As a result, the degree of efficiency of the device is considerably higher than in prior art technology.

BRIEF DESCRIPTION OF THE DRAWINGS

The present invention will now be described in greater detail hereinbelow, with particular reference to the accompanying drawings, in which:

FIG. 2b is the section 2b—b in FIG. 2a;

FIG. 3b is the section 3b—b in FIG. 3a;

FIG. 4b is the section 4b—b in FIG. 4a;

FIG. 5b is the section 5b—b in FIG. 5a;

DETAILED DESCRIPTIONS OF PREFERRED EMBODIMENTS

Figure 1:
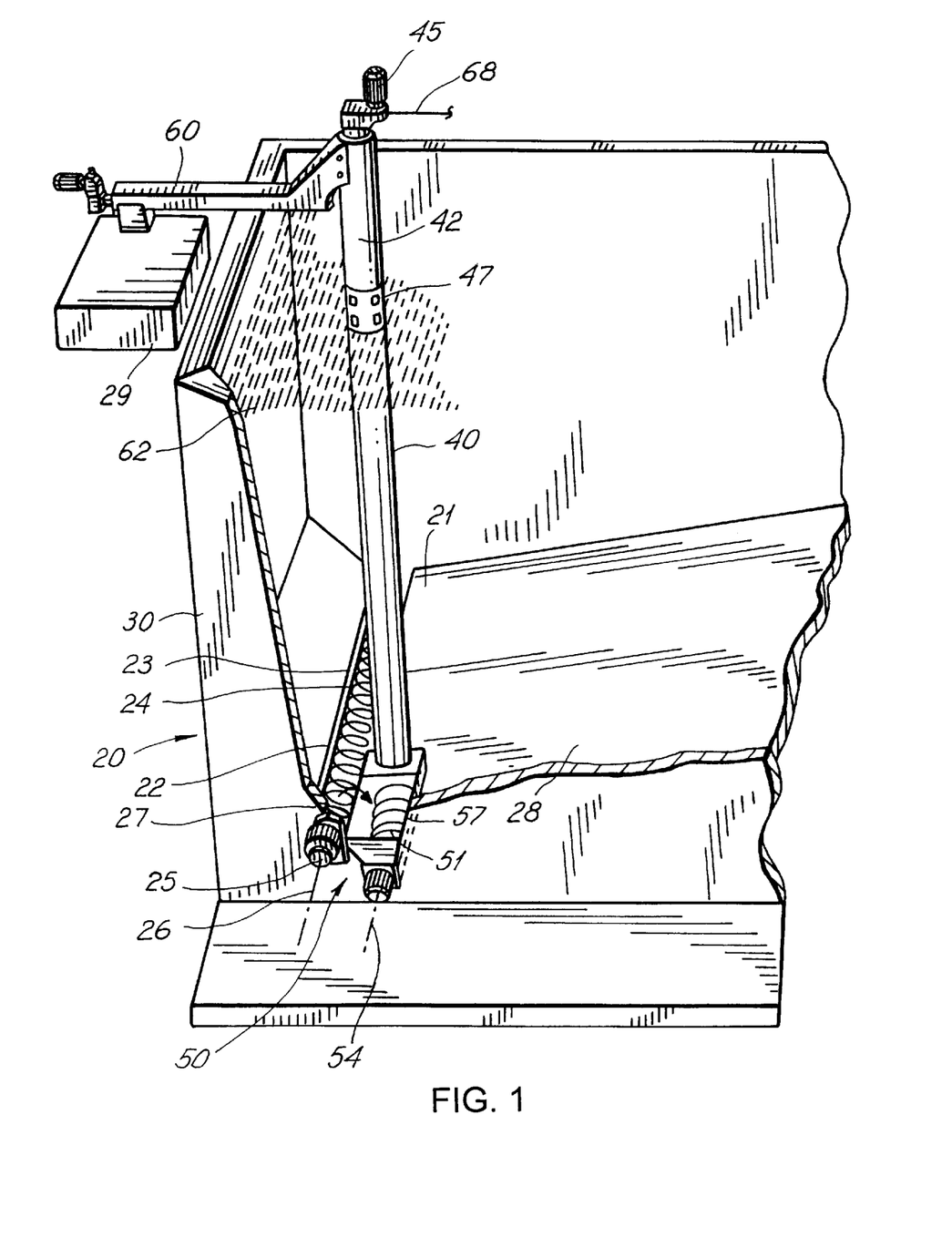
FIG. 1 is a cut-away schematic view of the device according to the present invention placed in one edge region of a pool or container.

FIG. 1 shows an arrangement including a pool (container) 20 with an edge region 21, the container being intended to be supplied with liquid containing particles (material) of a density which entails that the particles show a tendency to sink towards the bottom 28 of the container and there form a sediment. The normal filling level of the container 20 is shown at reference numeral 62. A first conveyor 22 is disposed, at the bottom 28 of the container, in an upwardly open path 23 in the edge region 21. The conveyor includes a screw thread 24 (the first screw thread) which, in certain embodiments, is provided with a mechanical shaft, while having no mechanical shaft in other embodiments. Drive means 25 for the rotation of the screw thread are, in the embodiment of the device shown on the drawing, provided in connection with the discharge portion 27 of the first conveyor and are illustrated in the Figure in one version in which the drive means are located outside the wall 30 of the pool or container. It will be obvious to a person skilled in the art that, in other embodiments, the drive means may be located within the container. The geometric longitudinal axis of the screw thread carries reference numeral 26.

A second conveyor 40 is provided in connection with the discharge portion 27 of the first conveyor and comprises a casing 41, a rotary screw thread 44 hence force also named the second screw thread 44 (FIG. 2a), an infeed portion 70 with an infeed opening 43 (FIG. 2a) located in the region of the bottom of the container, and a discharge portion 42 located above the normal filling level of the container. The casing 41 of the second conveyor is shown in the drawings according to one embodiment in which the casing has at least one corner. However, it will be obvious that, in other embodiments, the casing is of circular or oval cross-sections. In certain embodiments, the casing is provided with inner rib-like devices, in particular in those embodiments where the casing is of circular or oval cross-section. Drive means 45 for rotation of the screw thread are, in the illustrated embodiment, disposed above the filling level of the container. In the upper region of the casing and above the maximum filling level, the casing is, in one preferred embodiment, provided with drainage openings 47. In certain embodiments, the ejector of the discharge portion 42 is disposed above a screen grid which, in turn, is located above the highest filling level of the container.

In the embodiment shown in FIG. 1, a receptacle device 29 for sediment is provided in connection with the discharge portion 42 of the second conveyor. In certain embodiments, the receptacle device is fed with sediment directly from the discharge portion 42 of the conveyor, while, in other embodiments, a special conveyor unit 82 (in one preferred embodiment provided with drainage openings) connects the discharge portion with the receptacle device 29, or the receptacle device 29 is fed with material which is discharged by the ejector via the above disclosed screen grid.

Figure 3A:
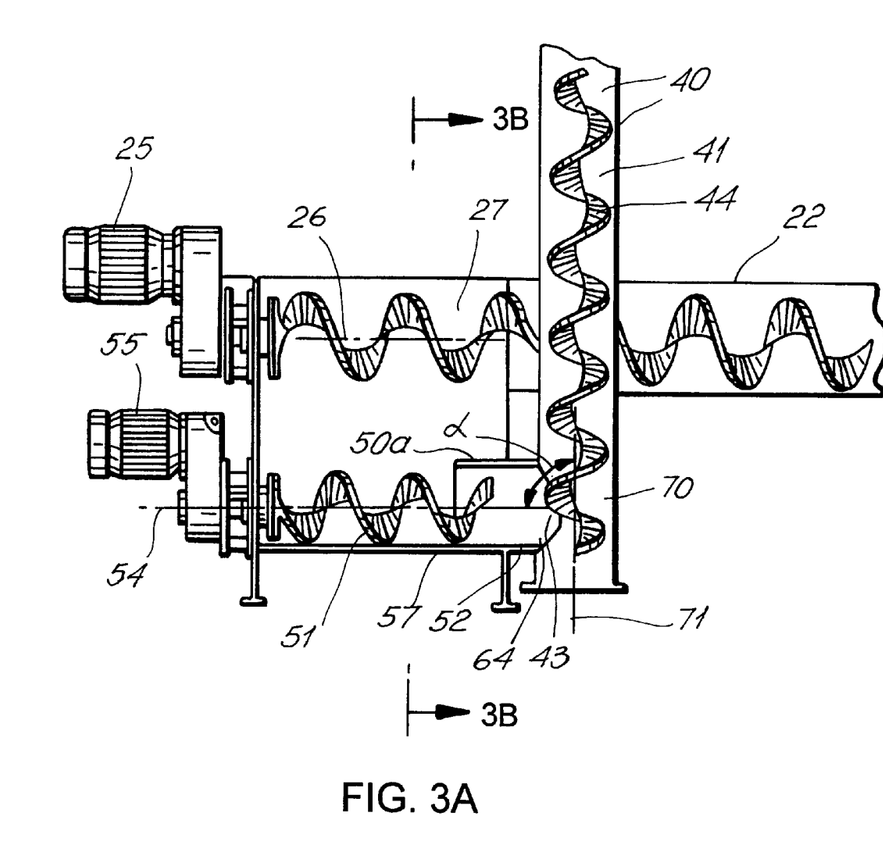
FIG. 3a shows a section corresponding to the section of FIG. 2a for an alternative embodiment corresponding to the section 3a—a in FIG. 3b.
Figure 3B:
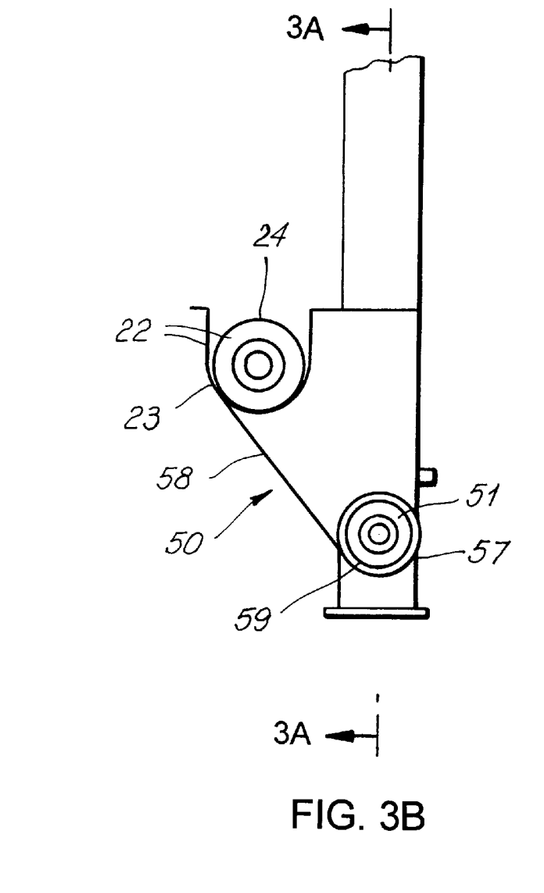

For transferring sediment from the first conveyor 22 to the second conveyor 40, there is disposed, in the region of the bottom 28 of the container, a mechanical device or transfer means 50. In FIGS. 3a and 3b. the mechanical device 50 is shown in one version in which it comprises a screw conveyor generally provided with a screw thread 51 which has no mechanical shaft. With its discharge portion 52, the screw conveyor connects via a mechanical device or a transfer means 50 to the second conveyor. The sediment is fed to the screw thread 51 from the first conveyor 22 and, on its rotation, the thread feeds in sediment into the lower portion of the second conveyor 40.

Figure 2A:
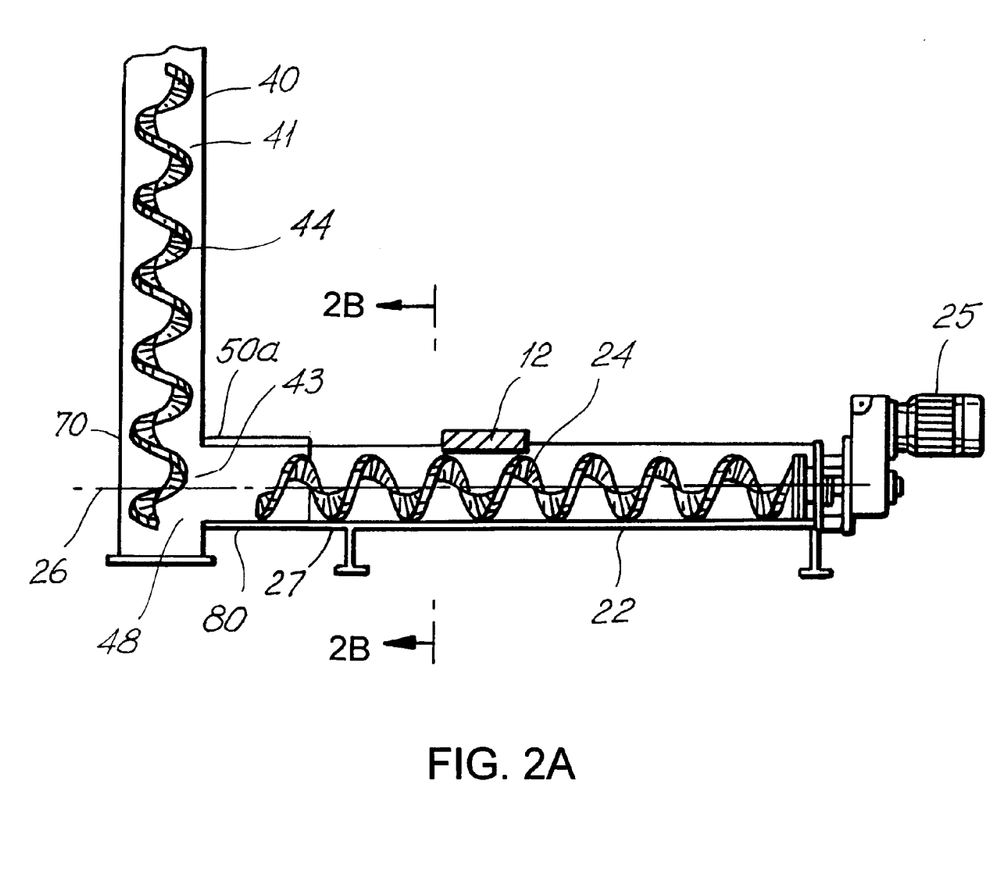
FIG. 2a is a section corresponding to the section 2a—a in FIG. 2b through an embodiment of vertical conveyor and a horizontal conveyor which operates as a ram conveyor to a mechanical or transfer means.
Figure 2B:
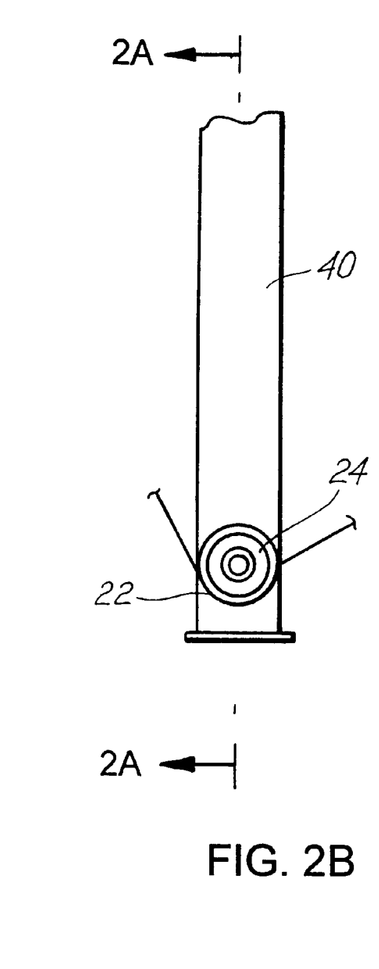

In the embodiment shown in FIGS. 2a and 2b the first conveyor 22 is, in its discharge end, connected to the second conveyor 40 via a short tube 50a which forms a substantially tight connection with the infeed opening 43 of the casing 41 of the second conveyor 40. The short tube forms the mechanical device 50. As a rule, the tube has a cross-section including at least one corner. However, it is obvious to a person skilled in the art that in other embodiments the tube has a circular or oval cross-section. In certain embodiments the tube has inner rib-like means, especially in the embodiments wherein the tube has a circular or oval cross-section.

The discharge portion 27 of the first conveyor 22 is as a rule disposed so as to permit the rotary screw thread 24 to extend into the tube 50a a short distance, as a rule less than half the outer diameter of the screw thread and in a preferred embodiment at least the outer diameter. Between the end of the screw thread and the infeed opening 43 of the second conveyor the tube forms a "thread-free" portion 80. Said portion has an extent corresponding at least to half the outer diameter of the screw thread and, as a rule, at least to the outer diameter of the screw thread.

As a rule and shown in FIGS. 2a,b, the drive means of the first conveyor 22 are connected to the first conveyor at that end which is located furthest away from the connection of the first conveyor to the second conveyor. The dimensions of the infeed opening 43 of the second conveyor 40 are adapted to the dimensions of the tube 50a. The dimensions of the screw thread 51 and the infeed opening 43 are, in this instance, selected such that the cross-sectional area of the opening generally corresponds to the inner cross-sectional area of the tube 50a.

When the screw thread 24 of the first conveyor 22 rotates (cf. FIGS. 2a,b), material is accumulated in the "thread-free" portion 80 between the end of the thread and the infeed opening 43 of the second conveyor 40. Successively, the material fed into the portion 80 builds up a plug of accumulated material. The plug forms a stopping-up between the space within the casing 41 of the second conveyor and the liquid in the container 20 and prevents material in the second conveyor to pass backwardly to the pool. When the material in the plug has obtained a sufficient extent of compression and additional material is pushed into the tube, the plug starts to move through the infeed opening 43 of the second conveyor. At rotation of the screw thread 44 of the second conveyor the material fed into the second conveyor is moved towards the discharge portion 42 of the conveyor. In case both the screw thread 24 of the first conveyor 22 and the screw thread 44 of the second conveyor 40 are rotating and no material is fed towards the plug, the plug stays in its position, as the plug only moves towards the infeed opening 43 of the second conveyor when material, fed in by the screw thread 24 of the first conveyor, pushes against the plug. Consequently, the intended tightening between the internal space of the second conveyor 40 and the liquid in the pool 20 is maintained. Thus, no material already fed into the second conveyor 40 can move backwardly and pass into the pool via the infeed opening 81 of the second conveyor.

In a third embodiment, the mechanical device 50 includes special mechanical displacement means 57 (FIGS. 3–6) which take care of the sediment discharged from the discharge portion 27 of the first conveyor and feed this sediment to the second conveyor 40. In connection with FIGS. 3–6, embodiments for such mechanical means 57 will be described hereinbelow.

In certain practical applications, depending for example on the composition of the sediment and the rigidity of the screw thread 24 of the first conveyor 22, a support 12 is provided so as to keep the screw thread 24 in place and prevent it from "lifting".

FIGS. 3a and 3b show one embodiment in which the mechanical device 50 for displacing sediment from the first conveyor 22 to the second conveyor 40 includes a plate 58 disposed at an oblique angle and whose lower portion merges into a U-path 59 for a spiral thread 51 forming displacement means 57 coupled to the second conveyor 40. Analogous with that disclosed above for the interconnection of the first conveyor 22 with the second conveyor 40, the displacement means 57 include a discharge portion 52 which is connected to the second conveyor 40 via the tube 50a. The displacement means 57 cooperate via the tube 50a with the opening 64 of the second conveyor through which the second conveyor receives material from the displacement means 57. Drive means 55 for rotation of the spiral thread 51 of the displacement means 57 are connected to the displacement means. It will be apparent from the embodiment illustrated in FIGS. 3a and 3b that, in the embodiment shown in the two Figures the first conveyor 22 passes the second conveyor 40, and that the displacement means 57 are provided for conveying material in a direction which is opposed to that of the first conveyor. The displacement means 57 are located on a lower level than the discharge end of the first conveyor 20, in order to make it possible that material can be displaced from the first conveyor to the displacement means 57 in that the material sinks towards the displacement means.

Figure 4A:
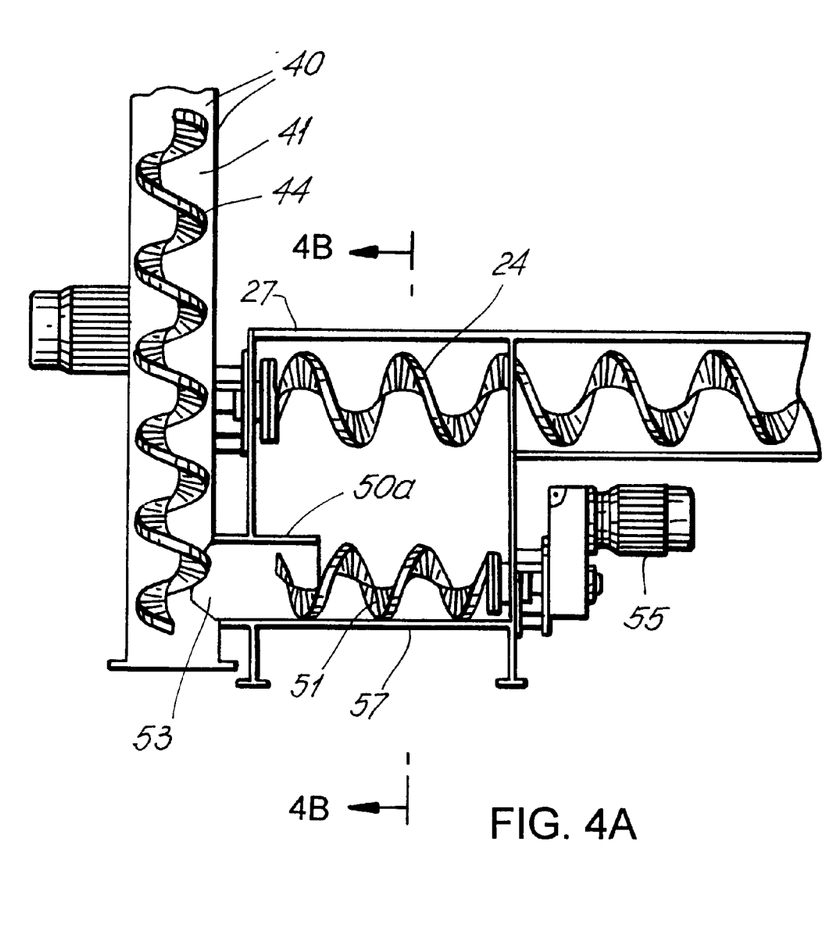
FIG. 4a is a section corresponding to the section of FIG. 2a for yet a further embodiment corresponding to the section 4a—a in FIG. 4b.
Figure 4B:
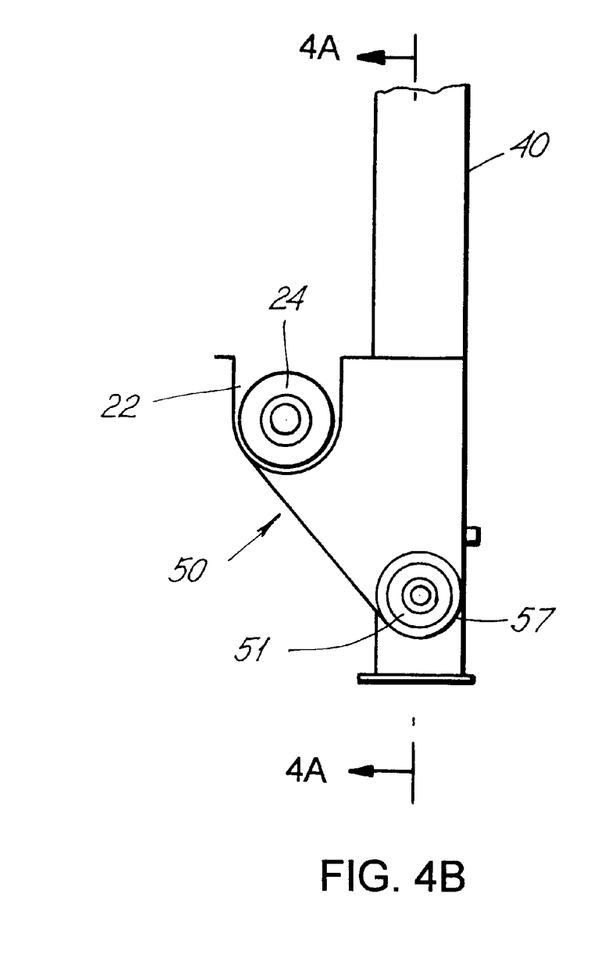

FIGS. 4a and 4b show an embodiment corresponding to that illustrated in FIGS. 3a and 3b but in which the discharge portion 27 of the first conveyor 22 is located ahead of the second conveyor 40. The mechanical device 50 for displacing sediment from the first conveyor to the second conveyor is of a construction which substantially corresponds to that described with reference to FIGS. 3a and 3b, with the difference being that the displacement means 57 are disposed to feed material in the same direction as the first conveyor.

Figure 5A:
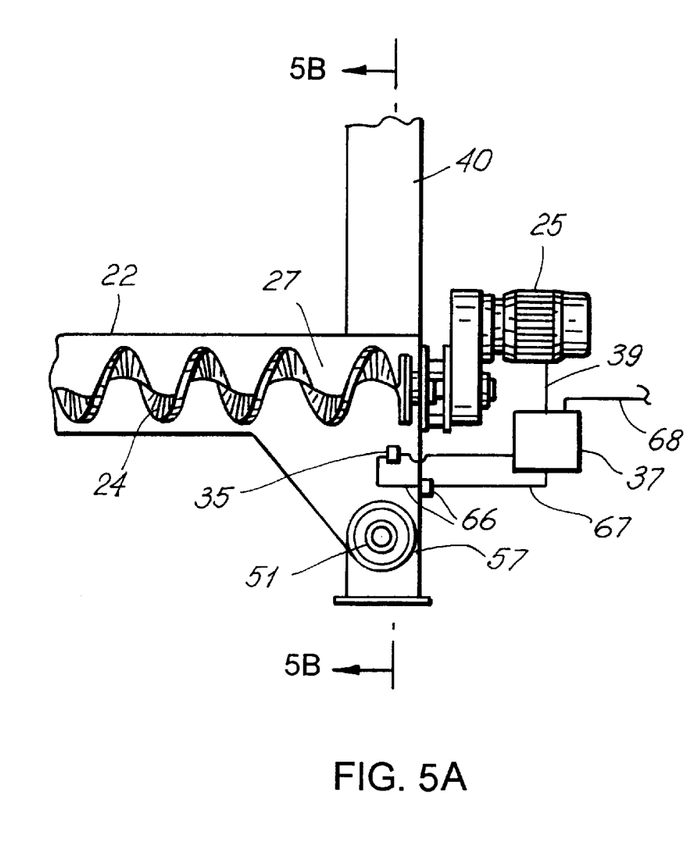
FIG. 5a is a section corresponding to the section of FIG. 2a for still a further embodiment corresponding to the section 5a—a in FIG. 5b.
Figure 5B:
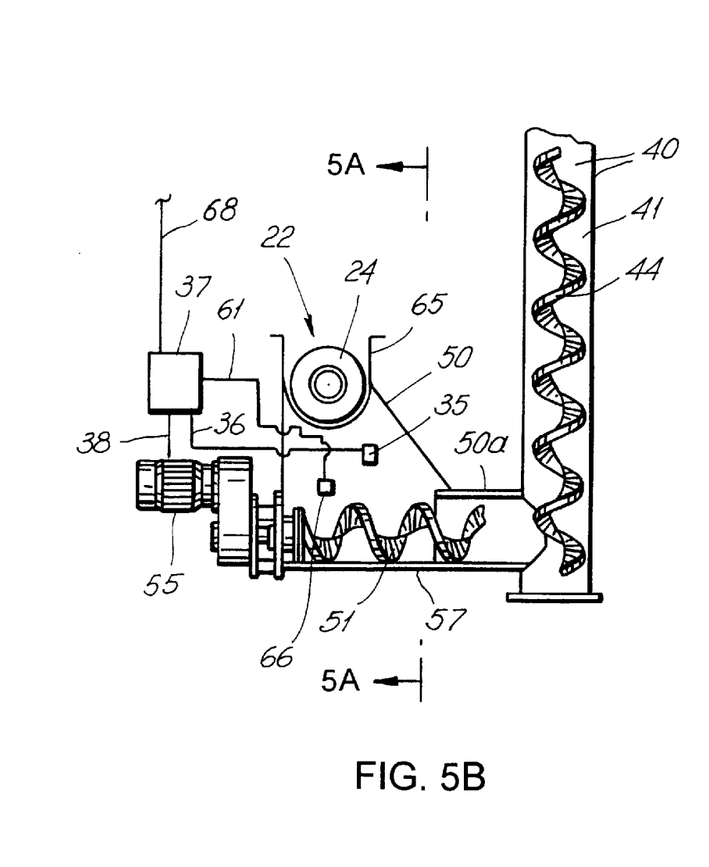

FIGS. 5a and 5b show one embodiment in which the mechanical feeder device 50 is adapted so as to permit the first conveyor 20 and the displacement means 57 to form an angle with one another, in which event the first conveyor passes over the displacement means. The discharge portion 27 of the first conveyor 22 then includes a downwardly open portion in the U-path 65 of the conveyor for discharging material from the first conveyor to the spiral thread 51 of the displacement means 57. The discharge portion of the displacement means is of a construction corresponding to that described above.

Figure 6A:
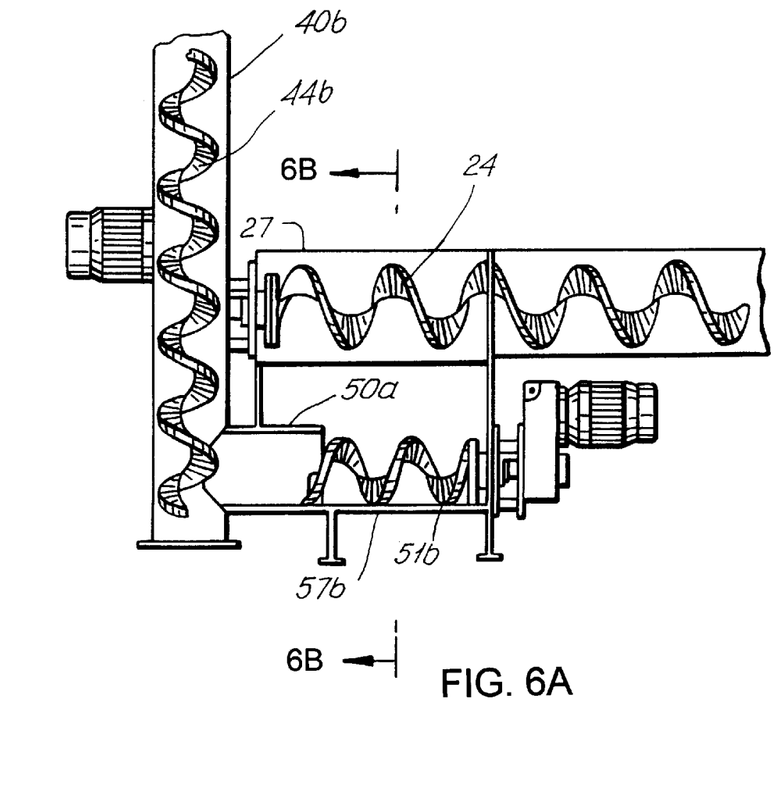
FIGS. 6a–b are sections corresponding to those previously disclosed, in which two other conveyors are employed and the displacement device comprises two feeder screws.
Figure 6B:
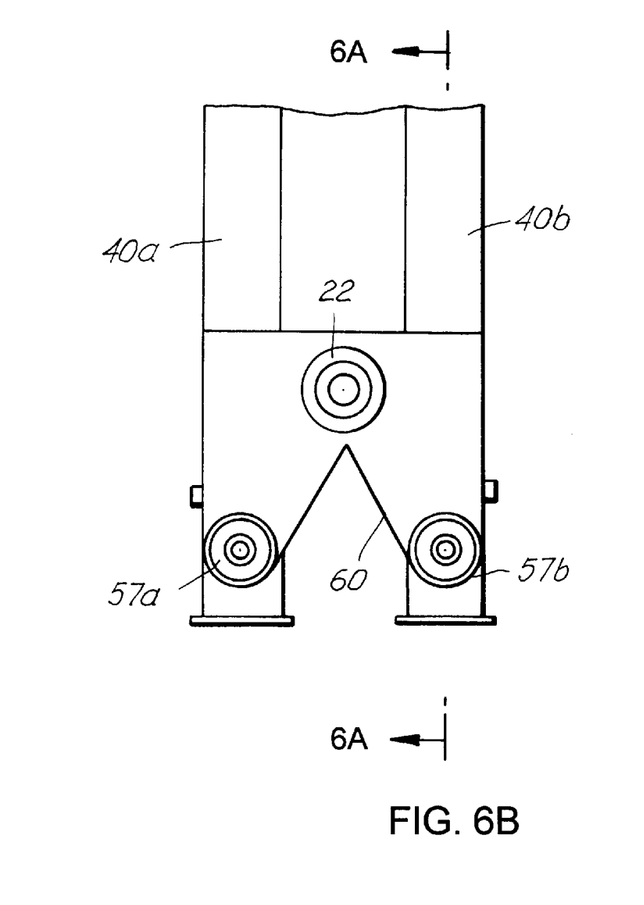

In the embodiment illustrated in FIGS. 6a and 6b, the device includes two second conveyors 40a, 40b. In such instance, the mechanical device 50 comprises two separate displacement means 57a, 57b which displace the material each into its second conveyor. Beneath the first conveyor, the mechanical device is provided with a guide surface 60 which is of V-shaped cross-section, with the apex or tip of the V facing upwards. The guide surface is formed, for example, from one or more metal sheets, is cast in concrete, etc. The "V-tip" of the cross-section is located beneath the first conveyor 22 and, as a rule, substantially in a vertical plane or somewhat offset in relation to a vertical plane through the geometric center axis of the first conveyor.

Figure 7A:
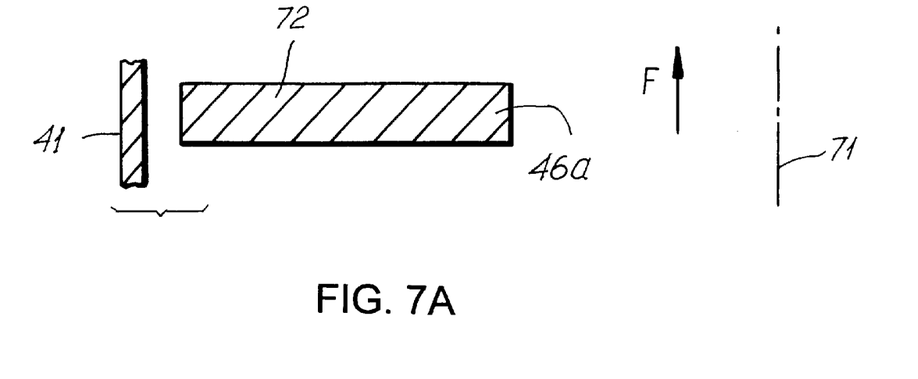
FIGS. 7a–c are sections through three embodiments of the conveyor vane of a screw thread.
Figure 7B:
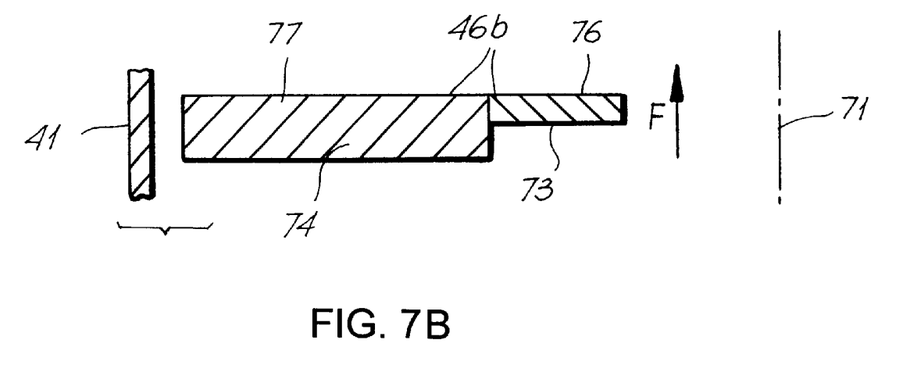
Figure 7C:
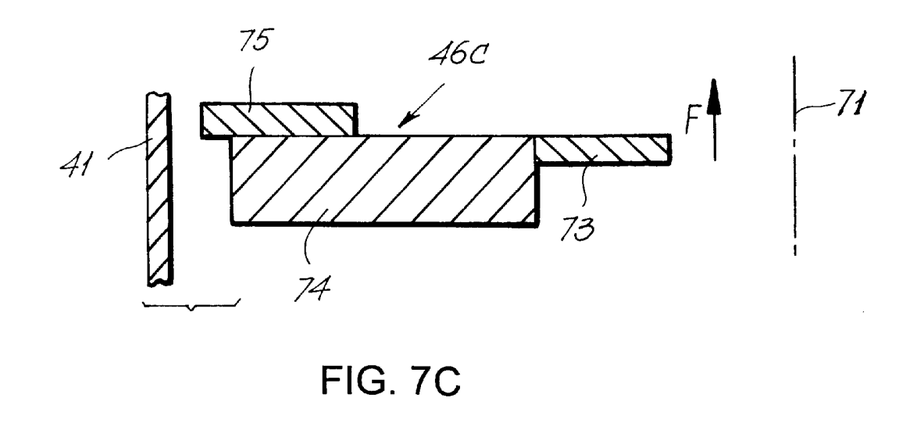

FIGS. 7a–c show three embodiments of the conveyor vane 46 of the screw thread 44. In FIG. 7a, the upstanding vane 46a consists of a single vane 72, in FIG. 7b the vane 46b consists of two part-vanes 73,74, while in FIG. 7c the vane 46c consists of three part-vanes 73,74,75. In the Figures, the casing 41 is also shown, as well as the geometric axis 71 of the second conveyor. The arrow F indicates the direction of displacement of the material, upwards in the second conveyor 40.

FIG. 7b shows one embodiment in which the extent of the first half-blade 73 located most proximal the geometric center axis is, in both the axial and the radial directions, shorter than the second half-blade 74 located most distal from the center axis 71. The drive surfaces 76,77 or both half-blades are disposed substantially flush with one another. The edge surface of the first half-blade 73 facing away from the center axis 71 abuts against the edge surface of the second half-blade 74 facing towards the center axis.

In FIG. 7c, a third part-blade 75 is fixed against the drive surface of the second part-blade 74. From the second part-blade 74, the third part-blade projects radially outwardly towards the casing 41. The third part-blade 75 is shorter in both radial and axial extent than the second part-blade 74. In the embodiments according to FIGS. 7b and 7c, the part-blades are fixed to one another.

In one preferred embodiment, at least one of the spiral threads disposed in the two separate displacement means 57 (cf. for example FIG. 3) is designed as a spiral (thread) with no mechanical shaft. As a rule, the corresponding situation applies to the first conveyor 22 and the second conveyors 40. The drive means 25, 35 for the first conveyor 22 and for the displacement means 57, respectively, are provided along or inside the wall 30 of the pool or container.

The geometric axis 54 in the transport direction of the screw thread 51 of the displacement means 57 is, at least in the discharge portion 52, directed towards the center of the screw thread 44 of the second conveyor. In certain embodiments, the axis 26 of the screw thread 44 of the second conveyor 40 and the screw thread of the displacement means 57 form an oblique angle with each other in the region of the discharge portion 42. In a plane through the geometric axis of the two screw threads, these form an angle α of at least approx. ±45° and preferably at least approx. ±60°. As a rule, the second conveyor 40 and the displacement means are oriented such that these geometric axes form substantially a right angle with each other.

As a rule, the screw thread of the displacement means is substantially horizontal, but in certain embodiments where material needs to be displaced in the vertical direction, it forms an oblique angle with a vertical plane, for example an angle of at most approx. 45° and preferably at most approx. 30°.

In certain embodiments there is provided (cf. FIG. 5), in connection to the mechanical device 50 for displacing sediment, a first sensor 35 for sensing the level of sediment in the displacement means 57. The sensor is connected via a signal communication 36 to a master unit 37 which, via a signal communication 38, is coupled to the drive means 55 of the displacement means and, via a signal communication 68 to the drive means 45 of the second conveyor 40. In certain embodiments, the master unit 37 is also connected to the drive means 25 of the first conveyor 22 via a signal communication 39. The master unit is operative on a time-lag basis first to start the drive means 45 of the second conveyor 40, thereafter the drive means 55 for the displacement means 57 and thereafter, also in certain embodiments, the drive means 25 of the first conveyor 22 when the sediment has reached the predetermined level in the mechanical device.

In certain embodiments. a further second sensor 66 is also provided, at a lower level than the first sensor. The second sensor is coupled via signal connections 67 to the master unit 37. The signal from the second sensor is utilized by the master unit for emitting signals to the drive means 45, 55 which entail that they stop.

In other embodiments. the power supplied to the drive means 55 of the displacement means is sensed, and when the power falls below a predetermined level, both the drive means 55 of the displacement means 57 and the drive means 45 of the second conveyor 40 are stopped. The time during which the drive means are to operate is, in certain embodiments, adjustable to a value which is based on the time consumed to transport a given quantity of material out of the mechanical device 50 and through the second conveyor 40. In reality, this implies that the requisite time is calculated based on the capacity of the displacement means 57, when the second conveyor is dimensioned to have a capacity which is at least as great as the capacity of the displacement means 57.

It is obvious that the above described technique relating to the master unit 37 and to sensors 35, 66 connected thereto is, in certain practical applications, employed for any of the embodiments whatever of the device according to the present invention.

Sediment which has accumulated in the first conveyor 22 is displaced thereby continuously or intermittently towards the discharge portion 27 of the conveyor. Via the mechanical device or transfer means 50, the sediment is transferred to the second conveyor 40 in that the sediment is displaced (forced) via the mechanical device or transfer means into the second conveyor. On rotation of the screw thread 44 in the second conveyor 40, the sediment is moved towards the discharge portion 42 of the second conveyor and departs from the second conveyor 40 via this portion in order, either directly or via the transport device 60, to be moved to the receptacle device 29. In those embodiments where a grid is provided in connection with the discharge portion of the conveyor, supplementary dewatering of the sediment takes place in addition to the dewatering which takes place in the conveyor 40 before movement to the receptacle device.

In one preferred embodiment, the transport device 82 is designed for reduction of the liquid content of the sediment. The drainage openings 47 in the casing of the second conveyor contribute in reducing the liquid content, in those embodiments of the device where such drainage openings are included. On displacement of the material in the second conveyor 40, continuous relaying of the material as a rule takes place, whereby passages are created for water to run back down towards the infeed portion of the second conveyor.

In certain embodiments, intermittent operation of the device is applied. The intermittent operation is, for example, time-controlled in response to the expected accumulation of sediment in the pool or container. When a certain quantity of sediment has normally been deposited, the drive means for the conveyors start and, where applicable, the drive means also for the displacement means 57. The drive means operate during a predetermined time interval, the accumulated sediment being moved from the bottom of the pool or container. In certain embodiments, the drive means are provided with devices which sense the relevant loading, whereupon the drive means are disengaged when the loading falls below a certain level.

In those embodiments where the mechanical device 50 includes one or more sensors 35, 66, the sensor or sensors, respectively, are generally disposed such that the drive means 55, 45 for the displacement means 57 and for the second conveyor 40 are only started when the level of the sediment in the mechanical device is so high that the screw thread 51 of the displacement device is wholly covered by the sediment. The sediment is generally allowed to accumulate to a level where the distance between the upper surface of the sediment and the screw thread is at least as great as the radius of the screw thread and, as a rule, at least as great as the diameter of the screw thread. In such instance, this is taken to signify the vertical distance between the screw thread and the upper surface of the sediment in a vertical plane through the centre axis of the screw thread. It will be obvious that the sediment has a sloping upper defining surface in the region of the displacement means 57. In certain practical applications, no casing will generally be needed about the displacement means 57 (the thread spiral) in the transition to the second conveyor 40, in particular when the above-disclosed distance is at least as great as the diameter of the screw thread.

The design of the transition described with reference to, among others FIGS. 2a,b between the first conveyor 22 and the second conveyor 40 is also generally applied in those embodiments which were described with reference to FIGS. 1, and 3–6.

The above detailed description has referred to but a limited number of embodiments of the present invention, but it will be readily perceived by a person skilled in the art that the present invention encompasses a large number of embodiments without departing from the spirit and scope of the appended claims.

What is claimed is:

1. Apparatus for displacement of sediment from the bottom of a container filled with liquid to a receptacle comprising:

a first conveyor disposed in a region near the bottom of said container, said first container including an upwardly open casing into which said sediment falls and a screw in said casing to transport said sediment therein to a discharge portion of the casing, a second conveyor having an inlet portion for receiving sediment from said first conveyor and including a casing and a screw in said casing to transport the sediment from said inlet portion of the casing of the second conveyor to a discharge portion of the casing of the second conveyor located above a maximum filling level of the liquid in the container, and transfer means disposed in said container for conveying the sediment from said discharge portion of the casing of the first conveyor to said inlet portion of the casing of the second conveyor, said transfer means having a third conveyor including a screw and a short cylindrical tube attached to an infeed opening of the inlet portion of the second conveyor, and said tube forming a "thread free" portion between the end of the thread of the screw of the second conveyor and the end of the thread of the screw or the transfer means providing means to form a plug of accumulated sediment fed by any of said screws.

2. Apparatus as claimed in claim 1, wherein said first conveyor extends transversely in said container, said discharge portion of the casing of the first conveyor being located near a side wall of the container, said second conveyor extending upwardly between opposite side walls of the container at a transversely spaced location from the discharge portion of the casing of the first conveyor, said second conveyor extending transversely in said container adjacent to said discharge portion of the casing of the first conveyor.

3. Apparatus as claimed in claim 1. wherein said casing of the second conveyor extends upwardly from the container to a level above the liquid filled in the container, said casing of the second conveyor being provided with drainage openings, above the liquid level in the container, through which liquid conveyed by said second conveyor can directly drop back into said container.

4. Apparatus as claimed in claim 1, wherein at least one of the screws of said first and second conveyors comprises a spiral without a mechanical shaft.

5. Apparatus as claimed in claim 1, comprising sensor means at the discharge portion of the first conveyor for sensing level of sediment at the discharge portion.

6. Apparatus as claimed in claim 5, wherein the screws of the first and second conveyors are driven by respective drive means, said sensor means being connected to said drive means to control operation thereof and drive of the respective screws based on the level of sediment sensed by said sensor means.

7. Apparatus as claimed in claim 1, wherein said screw of the transfer means is located at a level below the screw of the first conveyor.

8. Apparatus as claimed in claim 7, wherein the screw of the first conveyor and of the transfer means are rotatable about parallel axes.

9. Apparatus as claimed in claim 8, wherein the screw of the first conveyor and the screw of the transfer means transport the sediment in respectively opposite directions.

10. Apparatus as claimed in claim 7, wherein said transfer means further includes an inclined plate extending between said screw of the first conveyor and said screw of the transfer means.

11. Apparatus as claimed in claim 10, wherein said plate extends at least partially around said screw of the first conveyor and said screw of the transfer means.

12. Apparatus as claimed in claim 7, wherein the screw of the first conveyor and the screw of the transfer means are rotatable about perpendicular axes.

13. Apparatus as claimed in claim 7, wherein said transfer means includes a second said screw located parallel to the first said screw of the transfer means, and a casing in which said first and second screws rotate, said casing defining passages for conveying the sediment from the screw of the first conveyor to the two screws of the transfer means.

14. Apparatus as claimed in claim 13, wherein said casing of the transfer means includes a plate of inverted V-shape bounding said passages.

15. Apparatus as claimed in claim 1, wherein said first conveyor extends transversely in said container, said discharge portion of the casing of the first conveyor being located near a side wall of the container, said second conveyor extending upwardly between opposite side walls of the container at a transversely spaced location from the discharge portion of the casing of the first conveyor, said second conveyor extending transversely in said container between said discharge portion of the casing of the first conveyor and the inlet portion of the casing of the second conveyor.

16. Apparatus as claimed in claim 1, wherein said transfer means includes an upwardly opening casing in which said screw of the transfer means is rotatable.

17. Apparatus as claimed in claim 1, wherein at least one of the screws of said first and second conveyors and of said transfer means comprises a spiral without a mechanical shaft.

18. Apparatus as claimed in claim 1, comprising sensor means in said transfer means for sensing level of sediment at an inlet portion of the transfer means which receives sediment from the discharge portion of the casing of the first conveyor.

19. Apparatus as claimed in claim 18, wherein the screws of the first and second conveyors and of the transfer means are driven by respective drive means, said sensor means being connected to said drive means to control operation thereof and drive of the respective screws based on the level of sediment sensed by said sensor means.

\* \* \* \* \*